US009643086B2

(12) United States Patent
Tipping et al.

(10) Patent No.: US 9,643,086 B2
(45) Date of Patent: *May 9, 2017

(54) SPEED-DEPENDENT SUGGESTED DRIVING LINES

(75) Inventors: Michael Tipping, Girton (GB); Mark Andrew Hatton, Eye (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/829,342

(22) Filed: Jul. 1, 2010

(65) Prior Publication Data

US 2011/0159936 A1    Jun. 30, 2011

Related U.S. Application Data

(63) Continuation of application No. 12/260,102, filed on Oct. 20, 2008, now Pat. No. 7,749,057, and a continuation of application No. 12/710,202, filed on Feb. 22, 2010, now Pat. No. 7,837,544, said application No. 12/260,102 is a continuation of application No. 11/273,555, filed on Nov. 14, 2005, now Pat. No. 7,744,451.

(51) Int. Cl.
*A63F 13/00* (2014.01)
*A63F 13/5375* (2014.01)
*A63F 13/45* (2014.01)
*A63F 13/803* (2014.01)
*A63F 13/40* (2014.01)

(52) U.S. Cl.
CPC .......... *A63F 13/5375* (2014.09); *A63F 13/10* (2013.01); *A63F 13/45* (2014.09); *A63F 13/803* (2014.09); *A63F 2300/305* (2013.01); *A63F 2300/8017* (2013.01)

(58) Field of Classification Search
CPC ....... A63F 13/5375; A63F 13/10; A63F 13/45
USPC ................ 463/6, 23; 434/29, 30, 34, 61–64
See application file for complete search history.

(56) References Cited

U.S. PATENT DOCUMENTS

| | | | |
|---|---|---|---|
| 6,024,643 A * | 2/2000 | Begis .............................. | 463/42 |
| 6,200,138 B1 | 3/2001 | Ando et al. | |
| 6,652,376 B1 * | 11/2003 | Yoshida et al. ................... | 463/6 |
| 7,744,451 B2 | 6/2010 | Tipping et al. | |
| 7,749,057 B2 | 7/2010 | Tipping et al. | |
| 7,837,544 B2 | 11/2010 | Tipping et al. | |

* cited by examiner

*Primary Examiner* — Kang Hu
*Assistant Examiner* — Thomas H Henry
(74) *Attorney, Agent, or Firm* — Perkins Coie LLP

(57) ABSTRACT

In a video game or simulator, suggested speed indicators are computed along a suggested driving line on a path (e.g., a race track) and displayed in a simple, progressive, and user-friendly format. The displayed speed indicators are based on a racer's current speed and target speeds attributed to individual locations along the suggested driving line on the path. The speed indicators provide a dynamic indication of where and how the player should slow down or speed up relative to their current speed as their racer travels along the path. The speed indicators are displayed (e.g., using color to represent different magnitudes of suggested acceleration and deceleration) along the suggested driving line in front of the racer so that the player can anticipate braking and acceleration actions as the path and the racer's speed change.

35 Claims, 4 Drawing Sheets

SPEED-DEPENDENT SUGGESTED DRIVING LINES

This application is a continuation of, and claims priority from, U.S. patent application Ser. No. 12/710,202, filed Feb. 22, 2010; and is also a continuation of, and claims priority from, U.S. patent application Ser. No. 12/260,102, filed Oct. 29, 2008; both of which are continuations of, and claim priority from, U.S. patent application Ser. No. 11/273,555, filed Nov. 15, 2005, and all three of which are incorporated by reference herein in their entirety.

BACKGROUND

In racing video games, such as on a desktop computer, video game console, or other system, a player typically maneuvers a racer along a track in a virtual environment. Exemplary racers may include race cars or other vehicles, player avatars, and other racing entities. Furthermore, racing typically includes a competitive characteristic, such as racing for speed or accuracy (e.g., through gates), jumping for distance, racing with fuel conservation goals, dogfighting, etc. Such competitive characteristics can challenge the player in controlling the racer along a path, such as a race track or other route.

However, competitive racing, even in the virtual worlds of video games, requires a high level of skill and experience in order to achieve reasonable success. The variable racing environments, high-performance vehicles, and sophisticated AI or human competitors can present a steep learning curve for an uninitiated player. Some video games provide training features and sequences to help a new player learn the controls and fundamental skills required to initially compete in these environments. However, existing approaches fail to provide assistance that is sufficiently fine-grained, dynamic, unobtrusive, progressive, and accurate to provide a significant benefit for most new players.

SUMMARY

Implementations described and claimed herein address the foregoing problems by computing suggested speed indicators along a suggested driving line on a path (e.g., a race track) and displaying these speed indicators in a simple, progressive, and user-friendly format during game play. In one implementation, displayed speed indicators are based on a racer's current speed and target speeds attributed to individual locations along the suggested driving line on the path. The speed indicators provide a dynamic indication of where and how the player should slow down or speed up relative to their current speed as their racer travels along the path. The speed indicators are displayed along the suggested driving line in front of the racer so that the player can anticipate braking and acceleration actions as the path and the racer's speed change.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

BRIEF DESCRIPTIONS OF THE DRAWINGS

DETAILED DESCRIPTIONS

Figure 1:
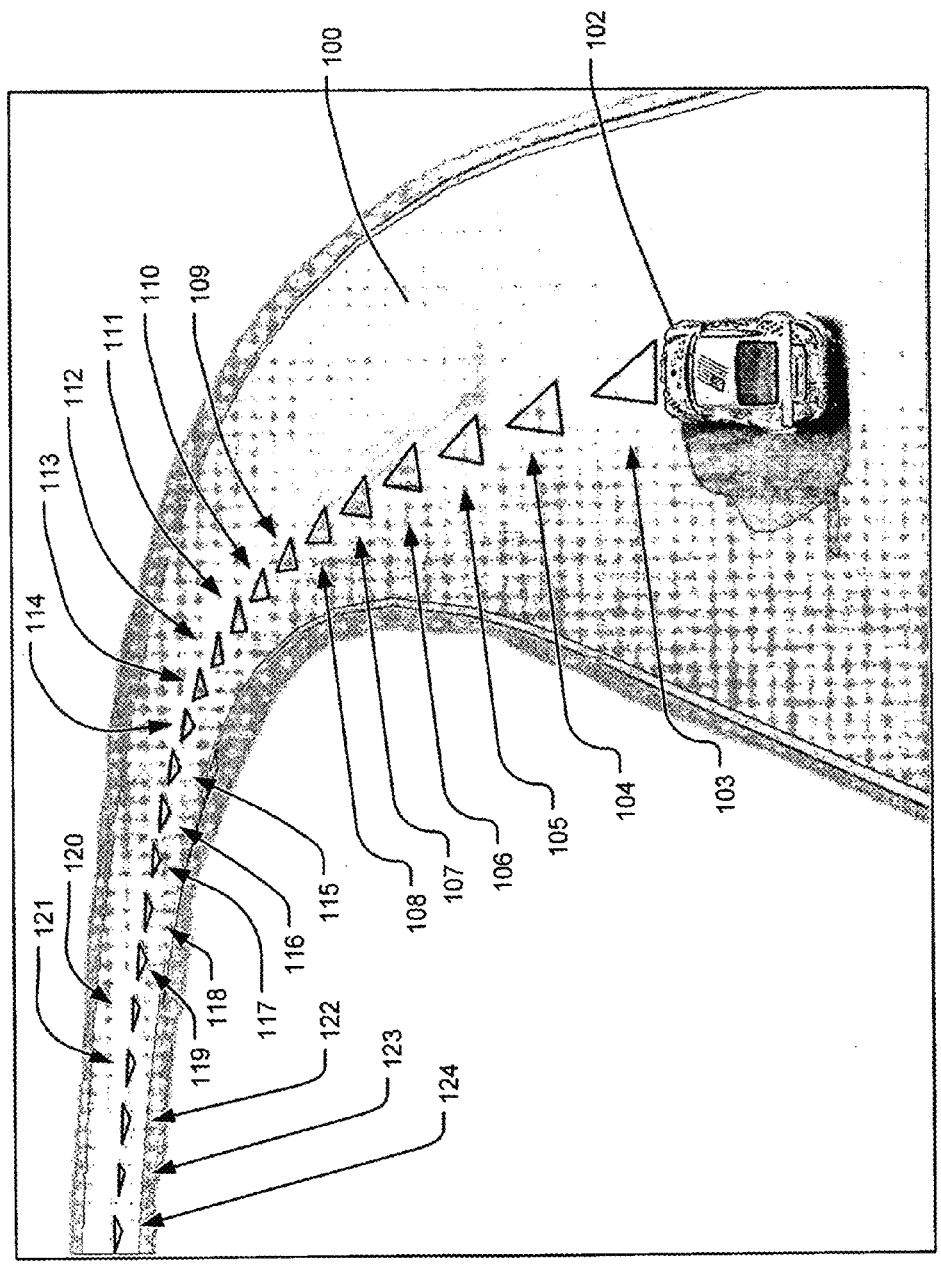
FIG. 1 illustrates a screenshot portion from an exemplary racing game.

FIG. 1 illustrates a screenshot portion from an exemplary racing game. The screenshot portion includes a curved portion of a race track 100 and a racer 102. In a typical scenario, a racer must slow down when entering a turn, like the turn shown on the race track 100, and then accelerate when exiting the turn. The timing and magnitude of deceleration actions (e.g., braking or easing off on the accelerator) and acceleration actions (e.g., depressing the accelerator) greatly impact the player's ability to control the racer, and generally, the player's competitiveness.

Accordingly, as the racer 102 is shown entering the turn, a sequence of progressively varied suggested speed indicators 103 et seq. are displayed along a suggested driving line in front of the racer 102. It should be understood that a "driving line" may include any path along which a game entity may be controlled, for example, by a user or the game's artificial intelligence engine, and is not limited to automobile or other driven vehicle game contexts. As such, a player controlling a running or flying character in a video game may follow a driving line, outside of a vehicle context.

Each suggested speed indicator is colored to indicate a level of suggested deceleration or acceleration. In the illustrated implementation, pure red, designated by RGB(255, 0, 0), indicates that the racer is moving at more than 5 meters/second too fast relative the target speed at a given location along the suggested driving line; amber, designated by RGB(255, 255, 0), indicates that the racer is moving at a speed generally equal to the target speed at a given location along the suggested driving line; and pure green, designated by RGB(0, 255, 0), indicates that the racer is moving at more than 5 meters/second too slow relative the target speed at a given location along the suggested driving line, with a continuum of color combinations ranging between the red, amber, and green points. For example, the colors of the suggested speed indicators in FIG. 1 are defined as follows, with levels of green indicating ranges of acceleration and levels of red indicating ranges of deceleration. Other color schemes may be employed in alternative implementations.

TABLE 1

Progressive Levels of Acceleration/Deceleration Indicated by Color

| Reference Numeral | Color | Suggested Speed Indicator |
|---|---|---|
| 103 | Dark Green | Acceleration |
| 104 | Light Green | Less acceleration |
| 105 | Amber Green | Less acceleration |
| 106 | Amber | No acceleration or deceleration |
| 107 | Light Orange | Deceleration |
| 108 | Orange | More deceleration |
| 109 | Reddish Orange | More deceleration |
| 110 | Light Red | More deceleration |
| 111 | Red | More deceleration |
| 112 | Red | More deceleration |
| 113 | Red | More deceleration |
| 114 | Red | More deceleration |

TABLE 1-continued

Progressive Levels of Acceleration/Deceleration Indicated by Color

| Reference Numeral | Color | Suggested Speed Indicator |
|---|---|---|
| 115 | Orange | Less deceleration |
| 116 | Amber | No acceleration or deceleration |
| 117 | Green | Full acceleration |
| 118 | Green | Full acceleration |
| 119 | Green | Full acceleration |
| 120 | Green | Full acceleration |
| 121 | Green | Full acceleration |
| 122 | Green | Full acceleration |
| 123 | Green | Full acceleration |
| 124 | Green | Full acceleration |

In FIG. 1, the suggested speed indicators are displayed as speed-dependent colored arrows along the suggested driving line, directly forward of the racer 102. If the racer 102 fails to follow the suggested driving line, however, the suggested speed indicators remain along the suggested driving line, even as the racer 102 is left or right of the suggested driving line. The colors of the arrows along the suggested driving line are computed based on the current speed of the racer 102 and a target speed attributed to each location along the suggested driving line. A target speed can represent the maximum speed a racer can attain without losing grip at a given location along the suggested driving line. In one implementation, the racer's highest attainable speed, lateral acceleration limit, braking deceleration limit, and the geometry of the suggested driving line (i.e., forward of the racer) are used to compute the target speed at a given location on the suggested driving line. Alternatively, a target speed can represent some other desirable speed in the game context (e.g., a speed required to avoid a collision, an optimal fuel consumption speed, etc.). These colors are dynamically updated periodically (e.g., each frame of the video game display, every x frames, etc.) using the current speed of the racer 102 at each interval.

In an alternative implementation, the speed-dependent colored arrows need not follow the suggested driving line exactly. For example, in one implementation, the speed-dependent colored arrows may follow along the suggested driving line, although be offset to one side of the line or other. In another implementation, the track itself or an off-track sequence of display elements may represent the suggested speed indicators. For example, the color of the track in front of the driver may change to progressively suggest speed changes or the interior and/or exterior barriers of the track may dynamically change colors to represent the suggested speed indicators.

Figure 2:
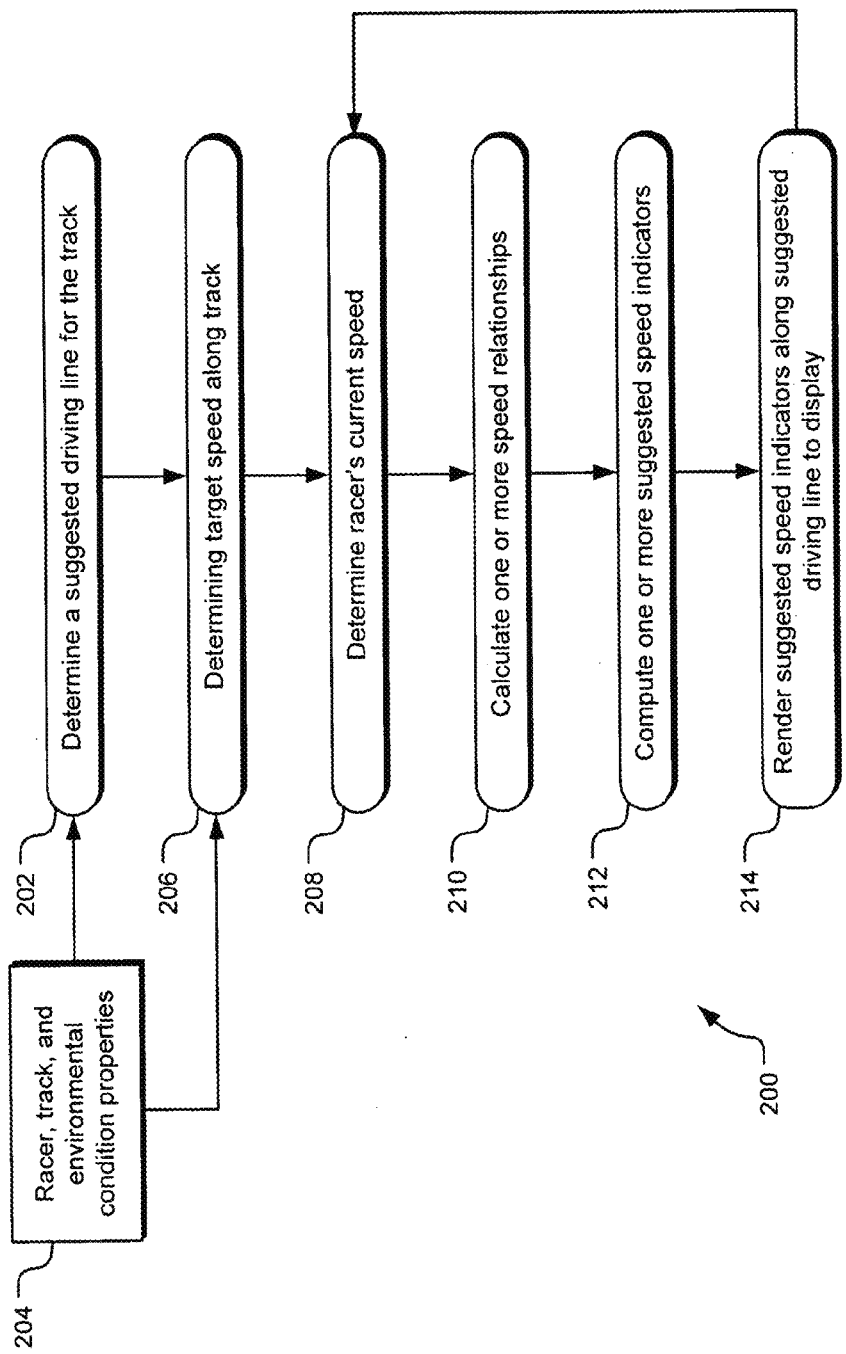
FIG. 2 illustrates exemplary operations for computing speed-dependent suggested driving lines.

FIG. 2 illustrates exemplary operations 200 for computing speed-dependent suggested driving lines. A determining operation 202 determines a suggested driving line for the path on which the racer will compete. For example, a race track can be associated with a suggested driving line that is defined to give an optimal competitive performance in a given scenario. In a qualifying race scenario, in which there are no other competitors (e.g., the racer races against the clock), the suggested driving line generally attempts to maximize overall speed throughout the race (e.g., over a number of laps). During a competitive race scenario, however, a racer may be forced to corner early or late (i.e., to block a passing competitor or to execute a pass of a competitor), depending on race conditions and the interaction with other racers. As such, although a suggested driving line may be conceptually helpful to a racer during a competitive race, the context of a competitive race may result in the winning racer's departure from the suggested driving line at numerous points during the race. Generally, a suggested driving line may be computed geometrically without regard to track physics (e.g., friction), racer characteristics (e.g., weight, grip and steering), environmental conditions (e.g., temperature and humidity), and other racers, although these features may also be taken into consideration.

A suggested racing line may be determined statically from data storage or computed dynamically, both on a track by track basis. For example, each track may be associated with its own suggested driving line, which is retrieved from data storage and applied to the track selected for the race. In one implementation, this suggested driving line may be manually determined or "drawn" by a developer. Alternatively, a suggested driving line may be individually computed for different tracks, different racers (e.g., Volkswagen Beetle versus Formula One racer), different video game players, and different track conditions (e.g., temperature, humidity, daylight, nighttime, etc.) using geometric techniques and the contribution of a physics engine module that simulates the physical effects of the game play. This computation may be accomplished at race initiation time and/or periodically throughout the race.

In yet another implementation, a supplemental suggested driving line may be computed dynamically from the current position of the racer. For example, in a competitive race scenario, if the racer takes a turn early to pass another racer on the inside of a turn, a supplemental suggested driving line may be computed and displayed to optimally return the racer to the original suggested driving line. This dynamically-computed supplemental suggested driving line may be calculated based on the current location and directional vector of the racer, its relation to the original suggested driving line, the type of racer, the environmental conditions, and other game parameters, and then be periodically updated (e.g., with each frame) until the racer returns to the original suggested driving line.

The supplemental suggested driving line may also be speed-dependent. For example, the supplemental suggested driving line may be represented by progressively colored arrows representing suggested speed indicators. The suggested speed indicators may be computed based on the location and directional vector of the racer, the geometry of the supplemental driving line as it merges with the original suggested driving line, and other game parameters to assist the player in returning the racer to the original suggested driving line. For example, if a racer is too low (i.e., not wide enough) going into a turn, therefore deviating from the original suggested driving line, the supplemental suggested driving line and suggested speed indicators may suggest an earlier and/or faster deceleration than the original suggested driving line and suggested speed indicators.

In one implementation of a supplemental suggested driving line, an appropriate "merge" point is dynamically computed based on the racer's current location and direction. In one implementation, the merge point may simply be at the intersection of the suggested driving line and a straight or curved line from the racer's current location emanating in the racer's current direction. The straight or curved line can represent the supplemental suggested line and can be displayed to the user to assist in bringing the racer back to the suggested driving line. The supplemental suggested driving line can change dynamically as the racer changes location and direction (e.g., in response to steering, collisions, etc.).

As discussed, the target speeds along the supplemental suggested driving line may be computed dynamically so as to assist the player in getting back to the original suggested driving line. In one implementation, the racer's highest attainable speed, lateral acceleration limit, braking deceleration limit, and the geometry of the supplemental suggested driving line (i.e., forward of the racer) are used to compute the target speed at a given location on the supplemental suggested driving line, although other combinations of parameters may also be employed. These parameters are input to a similar module as is used to compute the target speeds of the original suggested driving line to obtain target speeds on the supplemental suggested driving line.

In one implementation, both the original suggested driving line and the supplemental suggested driving line are shown concurrently in the video display, albeit possibly with different intensities. Alternatively, one or the other, or portions of both lines, may be shown at any one time.

The determining operation 202 may receive properties 204 from data storage or other data source. Such parameters may relate to the racer (e.g., vehicle characteristics), the track (e.g., track geometry, surface conditions, etc.), environmental conditions (e.g., lighting, wind, etc.) and other race characters (whether human-player opponents or non-player characters). In one implementation, the determining operation 202 can use these parameters in the calculation of the original suggested driving line for the track, although other implementations may not use some or all of these parameters in the determining operation 202.

Another determining operation 206 determines a target speed at individual locations along the track. Such locations may be spaced on the original suggested driving line or at other locations along the track. Furthermore, target speeds may be associated with different directional vectors at the same location, so that a different target speed may apply when the racer is headed substantially in the direction of the original suggested driving line than when the racer is headed in a divergent direction from the original suggested driving line. Such target speeds may be pre-calculated at initialization time and attributed to locations on the track or may be dynamically computed and attributed during the race.

In one implementation, to compute the target speeds for a racer, physical properties of the racer and the race environment are considered. A physics engine module in the video game simulates the physical forces within the video game, including gravitational forces, frictional forces, collision effects, mechanical problems, track conditions, etc. Racer properties can be input to the physics engine module to compute the maximum sustainable lateral acceleration force (e.g., how capably the racer can corner), the maximum sustainable longitudinal deceleration (e.g., how capably the racer can brake), and the maximum straight line velocity (collectively, "racer limits"). Each of these properties may be obtained from the physics engine, which simulates the game action based on a broad assortment of environmental parameters and other inputs. It should be understood that such racer properties may change during game play, such as if the racer is damaged during a race.

The determining operation 206 therefore combines the geometric properties of the track (e.g., lateral curvature, slope, undulation, camber, etc.) with the racer limits to compute the target speeds along the suggested driving line. One implementation computes the "maximum" speed for any given car on any given line on any given track. This calculation is inevitably approximate but physically realistic. The calculation can also be performed at development time, initialization time, or at game time and takes into account the properties of the car, the geometry of the line to be driven and the topology of the track. In a straight line, this maximum speed can be relatively simple to compute: it is limited by the top speed of a car itself. On and approaching a corner, the calculation is more complex: speed will be limited by the geometry of the line, the topology of the track, the car's lateral grip and its capacity to brake. Alternatively, the target speeds may be set manually for each track and vary for different combinations of racer, track condition, etc. In one implementation, the target speeds are computed at intervals along the suggested driving line (e.g., every 2 meters), although other location constraints may be employed.

A speed operation 208 determines the current speed of a racer periodically (e.g., each frame, every x frames, etc.) by querying the physics engine, which models the current speed of the racer in accordance with the environmental parameters of the virtual world in which the race takes place. A computation operation 210 calculates a relationship between the current speed of the racer and the target speeds associated with one or more locations in front of the racer. In one implementation, this relationship is the difference between the current speed and a target speed, although other relationships may be employed, including ratios, interpolated slopes, etc. Furthermore, in one implementation, the current speed is compared against target speeds for a projected distance in front of the racer (e.g., 120 meters), although the projected distance may dynamically change depending on various conditions, including velocity, line of sight, lighting conditions, elevation changes, etc.

Another computation operation 212 computes one or more suggested speed indicators for each location within the projected distance. In one implementation, if the relationship takes the form of the difference between the current speed and the target speed (i.e., current speed minus target speed), then the suggested speed indicators may have positive and negative values (as well as zero when the current speed equals the target speed). Other relationships, such as ratios, slopes, etc. may also be attributed with various suggested speed categories.

In one implementation, colors may be attributed to ranges of speed differences, such that green is attributed to highly negative values, red is attributed to highly positive values, amber is attributed to a range of values centered generally about zero, etc. The attributions can form a progressive color continuum from green to amber to red to indicate incremental magnitudes of acceleration and deceleration. Alternatively, other formats of suggested speed indicators may be employed, including varying size, frequency, brightness, darkness, and/or opacity of arrows or other indicators on the suggested driving line, or other progressive suggested speed indicators along the track.

A rendering operation 214 creates graphics data representing the suggested speed indicators for display in the video game. In the next interval (e.g., the next frame), processing returns to the speed operation 208 to determine the speed of the racer at a new location on the track. It should be understood that processing may alternatively return to operations 202 or 206 to dynamically re-compute the suggested driving line or targets speeds at various intervals (e.g., for different racer locations, changes in conditions, etc.). Similar formats can be applied to other relationships, such as ratios, slopes, etc.

Figure 3:
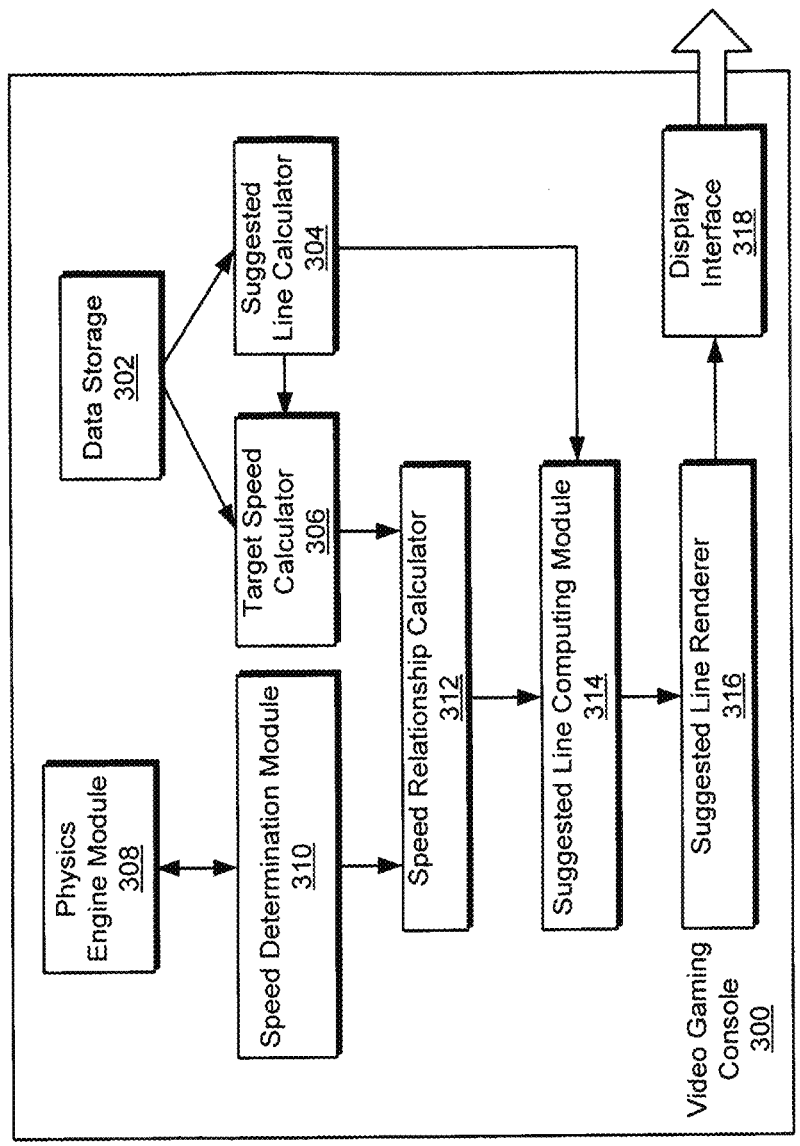
FIG. 3 illustrates exemplary modules in a video gaming console that computes speed-dependent suggested driving lines.

FIG. 3 illustrates exemplary modules in a video gaming console 300 that computes speed-dependent suggested driving lines. It should be understood that the described technology may be implemented in other computing systems, such as desktop computers, laptop computers, portable gaming devices, mobile phones, video game kiosks, set top boxes, etc. The described technology may also be integrated into actual vehicles (e.g., automobiles, boats, planes, etc.) via heads-up displays (HUDs) and other output devices.

A data storage module 302 stores racer properties for a variety of racers. Racers may include virtual vehicles (e.g., race cars, motorcycles, boats, trucks, snowmobiles, space ships) and other entities (e.g., skateboarders, skiers, snowboarders, skaters, player avatars). Such properties may include properties quantifying capabilities of speed, acceleration, braking, cornering, reliability, traction; physical characteristics, such as weight, height, center-of-gravity; and/or other properties that may contribute to the performance of the racer. The data storage module 302 may also store track properties for a variety of tracks (e.g., lateral track geometry, slope, and coefficients of friction) and environmental properties for a variety of conditions (e.g., wind, humidity, heat).

Such parameters may be used by a suggested driving line calculator 304 to determine an original suggested driving line for a selected track. In addition, such parameters, as well as the suggested driving line itself, may be used by a target speed calculator 306 to compute target speeds (e.g., generally "optimal" speeds) for multiple locations along the track, and potentially along the original suggested driving line. These modules can make their calculations at initiation time or dynamically during the race. Alternatively, both the target speeds and the suggested line may be statically defined for each track at development time. In one or more implementations, the suggested driving line calculator 304 and target speed calculator 306 may receive input from a physics engine module 308 to compute respectively the suggested driving line and target speeds results.

A speed determination module 310 queries the physics engine module 308 to obtain the speed of the racer at individual points in time during the race. In some implementations, this determination is performed every frame, although other intervals may be employed. Furthermore, such speed determination actions may be triggered in a non-periodic fashion in some circumstances, such as by detection of certain conditions (e.g., the proximity of a turn in front of the racer).

A speed relationship calculator 312 receives the racer speed results from the speed determination module 310 and the target speed results from the target speed calculator 306 and determines relationships between these values (i.e., between the current racer speed and individual target speed results associated with individual locations on the track in front of the racer). The relationships are input to a suggested line computing module 314, which maps the relationships into suggested speed indicators along the original suggested driving line. It should be understood, however, that the suggested line computing module 314 could also compute suggested speed indicators along a supplemental suggested driving line.

A suggested line renderer 316 generates graphics information representing the suggested speed indicators along the suggested driving line (and/or the supplemental suggested driving line). A display interface 318 communicates the graphics information to a display (e.g., a monitor, a television, HUD, etc.) for viewing by the player.

Figure 4:
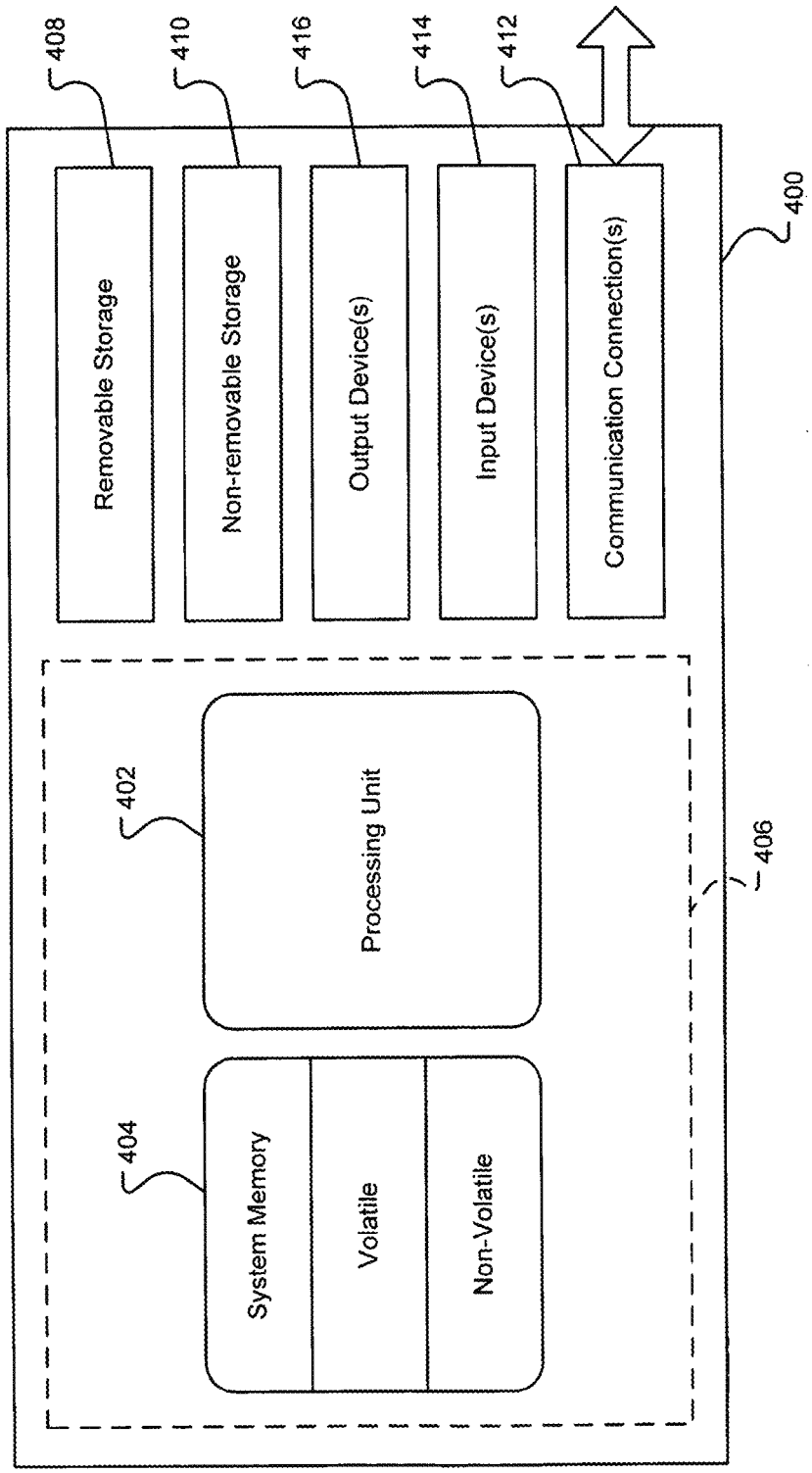
FIG. 4 illustrates an exemplary system that may be useful in implementing the described technology.

FIG. 4 illustrates an exemplary computing system 400 that may be used to execute instructions and operations defined herein. In one implementation, the computer system 400 may be embodied by a desktop or laptop computer, although other implementations, including video game consoles, set top boxes, portable gaming systems, mobile phones, in-vehicle computing modules, etc. may incorporate the described technology.

The computing system 400 typically includes at least one processing unit 402 and memory 404. Depending upon the exact configuration and type of the computing system 400, the memory 404 may be volatile (e.g., RAM), non-volatile (e.g., ROM and flash memory), or some combination of both. The most basic configuration of the computing system 400 need include only the processing unit 402 and the memory 404 as indicated by the dashed line 406.

The computing system 400 may further include additional devices for memory storage or retrieval. These devices may be removable storage devices 408 or non-removable storage devices 410, for example, magnetic disk drives, magnetic tape drives, and optical drives for memory storage and retrieval on magnetic and optical media. Storage media may include volatile and nonvolatile media, both removable and non-removable, and may be provided in any of a number of configurations, for example, RAM, ROM, EEPROM, flash memory, CD-ROM, DVD, or other optical storage medium, magnetic cassettes, magnetic tape, magnetic disk, or other magnetic storage device, or any other memory technology or medium that can be used to store data and can be accessed by the processing unit 402. Information may be stored on the storage media using any method or technology for storage of data, for example, computer readable instructions, data structures, and program modules.

The computing system 400 may also have one or more communication interfaces 412 that allow the system 400 to communicate with other devices. The communication interface 412 may be connected with a local area network (LAN), a wide area network (WAN), a telephony network, a cable network, the Internet, a direct wired connection, a wireless network, e.g., radio frequency, infrared, microwave, or acoustic, or other networks enabling the transfer of data between devices. Data is generally transmitted to and from the communication interface 412 over the network via a modulated data signal, e.g., a carrier wave or other transport medium. A modulated data signal is an electromagnetic signal with characteristics that can be set or changed in such a manner as to encode data within the signal.

The computing system 400 may further have a variety of input devices 414 and output devices 416. Exemplary input devices 414 may include a keyboard, a mouse, a tablet, a touch screen device, a game controller, a steering wheel controller, acceleration and brake controls, a scanner, a visual input device, and a microphone or other sound input device. Exemplary output devices 416 may include a display monitor, a printer, and speakers. Such input devices 414 and output devices 416 may be integrated with the computing system 400 or they may be connected to the computing system 400 via wires or wirelessly, e.g., via a Bluetooth protocol. These integrated or peripheral input and output devices are generally well known and are not further discussed herein.

In an exemplary implementation, a speed relationship calculator, a suggested line computing module, a suggested line renderer, a target speed calculator, and other modules may be embodied by instructions stored in memory 404 and/or storage devices 408 and 410 and processed by the processing unit 402. Racer properties, track properties, environmental properties, suggested speed indicators, and other data may be stored in memory 404 and/or storage devices 408 and 410.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understand that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A system comprising:
   a storage medium storing instructions of
      a first module configured to determine target speeds for a racer, wherein the target speeds are attributed to locations along a suggested driving line of a path in a video game;
      a second module configured, based on a speed relationship between a determined target speed of a location and a speed of the racer, to select from a plurality of indicators a suggested indicator that indicates a magnitude of rate of change of speed derived from the speed relationship, the plurality of indicators including indicators for multiple magnitudes of positive rate of change of speed or multiple magnitudes of negative rate of change of speed or both; and
      a display interface module configured to communicate information for displaying the suggested indicator along the path as a suggestion to the racer of magnitude of rate of change of speed that is needed to attain the determined target speed at the location; and
   a processing unit for executing the instructions stored in the storage medium.

2. The system of claim 1, wherein the plurality of indicators include at least three indicators for magnitudes of acceleration or at least three indicators for magnitudes of deceleration.

3. The system of claim 1, wherein the plurality of indicators include an indicator for a magnitude of acceleration and indicators for magnitudes of deceleration.

4. The system of claim 1, wherein the plurality of indicators include indicators for magnitudes of acceleration and an indicator for a magnitude of deceleration.

5. The system of claim 1, wherein the indicators having colors that include a level of green indicating at least one magnitude of acceleration for the racer.

6. The system of claim 1, wherein the indicators having colors that include a level of red indicating at least one magnitude of deceleration for the racer.

7. The system of claim 1, wherein the suggested indicator is displayed as a colored arrow along the path.

8. The system of claim 1, wherein the suggested indicator is displayed along the suggested driving line.

9. The system of claim 1 wherein the first module determines the target speed for the racer factoring in a physical property of the racer.

10. The system of claim 9 wherein the physical property is maximum sustainable longitudinal deceleration.

11. The system of claim 9 wherein the physical property is maximum sustainable lateral acceleration force.

12. The system of claim 9 wherein the physical property is maximum straight line velocity.

13. One or more tangible computer-readable storage media that is not a signal having computer-executable instructions that, when executed by a computing device, implement a method comprising:
   determining, for a racer, target speeds at one or more locations along a suggested driving line of a path in a video game;
   computing suggested indicators based on the determined target speeds and the racer's speed, wherein the suggested indicators correspond to the one or more locations and comprise one or both of:
   acceleration indicators colored to indicate magnitude of suggested acceleration along the suggested driving line; or
   deceleration indicators colored to indicate magnitude of suggested deceleration along the suggested driving line;
   wherein different colors for the acceleration indicators represent different magnitudes of acceleration and different colors for the deceleration indicators represent different magnitudes of deceleration; and
   displaying the suggested indicators along the path.

14. The one or more tangible computer-readable storage media of claim 13, wherein the suggested indicators include at least three acceleration indicators or at least three deceleration indicators.

15. The one or more tangible computer-readable storage media of claim 13, wherein the suggested indicators include an acceleration indicator and deceleration indicators.

16. The one or more tangible computer-readable storage media of claim 13, wherein the suggested indicators include acceleration indicators and a deceleration indicator.

17. The one or more tangible computer-readable storage media of claim 13, wherein the acceleration indicators are colored at least one level of green to indicate the at least one level of suggested acceleration.

18. The one or more tangible computer-readable storage media of claim 13, wherein the deceleration indicators are colored at least one level of red to indicate the at least one level of suggested deceleration.

19. The one or more tangible computer-readable storage media of claim 18, wherein the suggested indicators are colored to form a progressive color continuum.

20. The one or more tangible computer-readable storage media of claim 13, further comprising displaying the suggested indicators along the suggested driving line of the path.

21. One or more tangible computer-readable storage media that is not a signal storing computer-readable instructions that implement a method for controlling a computing device to assist in controlling speed of an entity, the method comprising:
- determining a target speed for the entity;
- determining a speed relationship between the target speed of the entity and a prior speed of the entity;
- selecting from a plurality of indicators an indicator that indicates a magnitude of rate of change of speed derived from the speed relationship, the plurality of indicators including indicators for multiple magnitudes of rate of change of speed for acceleration and/or multiple magnitudes of rate of change of speed for deceleration; and
- displaying on a display device the selected indicator as a suggestion to the entity to change speed to attain the determined target speed.

22. The one or more tangible computer-readable storage media of claim 21 including displaying an indication of a path and a suggested travel line along the path.

23. The one or more tangible computer-readable storage media of claim 21, wherein the plurality of indicators include at least three indicators for multiple magnitudes of rate of change of speed for acceleration or at least three indicators for multiple magnitudes of rate of change of speed for deceleration.

24. The one or more tangible computer-readable storage media of claim 21, wherein the plurality of indicators include an indicator for a magnitude of rate of change of speed for acceleration and indicators for multiple magnitudes of rate of change of speed for deceleration.

25. The one or more tangible computer-readable storage media of claim 21, the plurality of indicators include indicators multiple magnitudes of rate of change of speed for acceleration and an indicator for a magnitude of rate of change of speed for deceleration.

26. The one or more tangible computer-readable storage media of claim 21 wherein the plurality of indicators indicate colors for a track on which the entity is traveling.

27. The one or more tangible computer-readable storage media of claim 21 wherein the plurality of indicators vary in size to indicate magnitude of rate of change of speed.

28. The one or more tangible computer-readable storage media of claim 21 including displaying an indication of a path and wherein the selected indicator is displayed in association with a location along the displayed path.

29. One or more tangible computer-readable storage media that is not a signal storing computer-readable instructions that implement a method for controlling a computing device to assist in controlling speed of an entity, the method comprising:
- determining a target speed for the entity;
- determining a speed relationship between the target speed of the entity and a prior speed of the entity;
- selecting from a plurality of indicators an indicator that indicates a magnitude of rate of change of speed derived from the speed relationship, the plurality of indicators including indicators for multiple magnitudes of rate of change of speed for acceleration and multiple magnitudes of rate of change of speed for deceleration wherein the plurality of indicators includes a first acceleration indicator, a second acceleration indicator, a first deceleration indicator, and a second deceleration indicator; and
- displaying on a display device the selected indicator as a suggestion to the entity to change speed to attain the determined target speed.

30. The one or more tangible computer-readable storage media of claim 29 wherein the first acceleration indicator having a first acceleration color indicating a first magnitude of acceleration, the second acceleration indicator having a second acceleration color indicating a second magnitude of acceleration, the first deceleration indicator having a first deceleration color indicating a first magnitude of deceleration, and the second deceleration indicator having a second deceleration color indicating a second magnitude of deceleration.

31. One or more tangible computer-readable storage media that is not a signal storing computer-readable instructions that implement a method for controlling a computing device to assist in controlling speed of an entity, the method comprising:
- determining a target speed for the entity;
- determining a speed relationship between the target speed of the entity and a prior speed of the entity;
- selecting from a plurality of indicators an indicator that indicates a magnitude of rate of change of speed derived from the speed relationship, the plurality of indicators including indicators for multiple magnitudes of rate of change of speed for acceleration and multiple magnitudes of rate of change of speed for deceleration wherein the indicators represent different magnitudes of acceleration by a continuum of acceleration colors and represent different magnitudes of deceleration by a continuum of deceleration colors; and
- displaying on a display device the selected indicator as a suggestion to the entity to change speed to attain the determined target speed.

32. A tangible memory that is not a signal storing computer-readable instructions that implement a method for controlling a computing device to assist in controlling speed of an entity, the method comprising:
- determining a target speed for the entity;
- determining a speed relationship between the target speed of the entity and a prior speed of the entity;
- selecting from a plurality of indicators an indicator that indicates a magnitude of acceleration derived from the speed relationship, the plurality of indicators including indicators for multiple magnitudes of acceleration; and
- displaying on a display device the selected indicator as a suggestion to the entity to change speed to attain the determined target speed.

33. The tangible memory of claim 32 wherein the plurality of indicators include at least three indicators for multiple magnitudes of acceleration.

34. A tangible memory that is not a signal storing computer-readable instructions that implement a method for controlling a computing device to assist in controlling speed of an entity, the method comprising:
- determining a target speed for the entity;
- determining a speed relationship between the target speed of the entity and a prior speed of the entity;
- selecting from a plurality of indicators an indicator that indicates a magnitude of deceleration derived from the speed relationship, the plurality of indicators including indicators for multiple magnitudes of deceleration; and
- displaying on a display device the selected indicator as a suggestion to the entity to change speed to attain the determined target speed.

35. The tangible memory of claim 34 wherein the plurality of indicators include at least three indicators for multiple magnitudes of deceleration.

\* \* \* \* \*